US008675926B2

(12) United States Patent
Zhang et al.

(10) Patent No.: US 8,675,926 B2
(45) Date of Patent: Mar. 18, 2014

(54) DISTINGUISHING LIVE FACES FROM FLAT SURFACES

(75) Inventors: Zhengyou Zhang, Redmond, WA (US); Qin Cai, Clyde Hill, WA (US); Pieter R. Kasselman, Dublin (IE); Arthur H. Baker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 862 days.

(21) Appl. No.: 12/796,470

(22) Filed: Jun. 8, 2010

(65) Prior Publication Data

US 2011/0299741 A1 Dec. 8, 2011

(51) Int. Cl.
*G06K 9/00* (2006.01)

(52) U.S. Cl.
USPC .......................................................... 382/118

(58) Field of Classification Search
None
See application file for complete search history.

(56) References Cited

U.S. PATENT DOCUMENTS

| | | | |
|---|---|---|---|
| 5,774,591 A | 6/1998 | Black et al. | |
| 7,336,830 B2 | 2/2008 | Porter et al. | |
| 8,121,356 B2 * | 2/2012 | Friedman et al. | 382/115 |
| 8,364,971 B2 * | 1/2013 | Bell et al. | 713/186 |
| 8,401,253 B2 * | 3/2013 | Yamada et al. | 382/118 |
| 2004/0240711 A1 | 12/2004 | Hamza et al. | |
| 2006/0078172 A1 | 4/2006 | Zhang et al. | |
| 2008/0187174 A1 | 8/2008 | Metaxas et al. | |
| 2011/0064313 A1 * | 3/2011 | Lee et al. | 382/195 |
| 2011/0115967 A1 * | 5/2011 | Lee | 348/349 |

FOREIGN PATENT DOCUMENTS

| | | | |
|---|---|---|---|
| KR | 1020030091345 A | | 12/2003 |
| KR | 10-0473600 | * | 6/2004 |
| KR | 1020040048753 A | | 6/2004 |
| WO | 0209024 A1 | | 1/2002 |
| WO | 2007099834 A1 | | 9/2007 |

OTHER PUBLICATIONS

"International Search Report", Mailed Date: Dec. 23, 2011, Application No. PCT/US2011/038066, Filed Date: May 26, 2011. pp. 9.
Yang, M. et al., "Efficient tree structured motion estimation using successive elimination", *IEE Proc.—Vis. Image Signal Process.*, vol. 151, No. 5, Oct. 2004, pp. 369-377.
Pan, et al., "Liveness Detection for Face Recognition", Retrieved at << http://intechweb.org/downloadpdf.php?id=5896&PHPSESSID=590gqs0be2poon9gqo3i3n4ha3 >>, Dec. 2008, pp. 109-124.

(Continued)

*Primary Examiner* — Vikkram Bali
(74) *Attorney, Agent, or Firm* — Anthony Azure; Andrew Sanders; Mickey Minhas (57) ABSTRACT

Multiple images including a face presented by a user are accessed. One or more determinations are made based on the multiple images, such as a determination of whether the face included in the multiple images is a 3-dimensional structure or a flat surface and/or a determination of whether motion is present in one or more face components (e.g., eyes or mouth). If it is determined that the face included in the multiple images is a 3-dimensional structure or that that motion is present in the one or more face components, then an indication is provided that the user can be authenticated. However, if it is determined that the face included in the multiple images is a flat surface or that motion is not present in the one or more face components, then an indication is provided that the user cannot be authenticated.

20 Claims, 6 Drawing Sheets

(56) References Cited

OTHER PUBLICATIONS

Pan, et al., "Eyeblink-Based Anti-Spoofing in Face Recognition from a Generic Webcamera", Retrieved at << http://citeseerx.ist.psu.edu/viewdoc/download?doi=10.1.1.137.4902&rep=rep1&type=pdf >>, The 11th IEEE International Conference on Computer Vision (ICCV'07), Oct. 14-20, 2007, pp. 8.

Jee, et al., "Liveness Detection for Embedded Face Recognition System", Retrieved at << http://www.waset.ac.nz/journals/ijbls/v1/v1-4-33.pdf >>, International Journal of Biological and Life Sciences, 2005, pp. 235-238.

Li, et al., "Live Face Detection based on the analysis of Fourier Spectra", Retrieved at << http://citeseerx.ist.psu.edu/viewdoc/download?doi=10.1.1.69.4563&rep=rep1&type=pdf >>, In Biometric Technology for Human Identification, 2004, pp. 8.

Chetty, et al., "Liveness Verification in Audio-Video Speaker Authentication", Retrieved at << http://citeseerx.ist.psu.edu/viewdoc/download?doi=10.1.1.126.5698&rep=rep1&type=pdf >>, Proceedings 10th Australian International Conference on Speech Science & Technology, SST, 2004, pp. 358-363.

Zhang, et al., "A Robust Technique for Matching Two Uncalibrated Images Through the Recovery of the Unknown Epipolar Geometry", Retrieved at << http://robotics.caltech.edu/readinggroup/vision/zhang94.pdf >>, French National Institute for Research in Computer Science and Control, May 1994, pp. 42.

\* cited by examiner

DISTINGUISHING LIVE FACES FROM FLAT SURFACES

BACKGROUND

The privacy of individuals or corporations is oftentimes maintained by allowing only select individuals to access various systems or locations. Automated systems for restricting access typically have a user identify himself or herself, and then the system authenticates the identification that the user provides. Such automated systems, however, are not without their problems. One such problem is that it is difficult for automated systems to distinguish between an authentic user identification and a fake or false user identification. Incorrect authentication by such automated systems can result in individuals being allowed to access systems or locations even though it is desired that they be restricted from accessing such systems or locations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, multiple images including a face presented by a user are accessed. A determination is made, based on the multiple images, of whether the face included in the multiple images is a 3-dimensional (3D) structure or a flat surface. If it is determined that the face included in the multiple images is a 3-dimensional structure, then an indication is provided that the user can be authenticated. However, if it is determined that the face included in the multiple images is a flat surface, then an indication is provided that the user cannot be authenticated.

In accordance with one or more aspects, multiple images including a face presented by a user are accessed. A determination is made, based on the multiple images, of whether motion is present in one or more components (e.g., eyes, mouth, etc.) of the face. If it is determined that motion is present in the one or more components of the face, then an indication is provided that the user can be authenticated. However, if it is determined that motion is not present in the one or more components of the face, then an indication is provided that the user cannot be authenticated.

BRIEF DESCRIPTION OF THE DRAWINGS

The same numbers are used throughout the drawings to reference like features.

DETAILED DESCRIPTION

Distinguishing live faces from flat surfaces is discussed herein. In order to authenticate a user for particular access (e.g., to a computer or network, to a building or other location, etc.), multiple images of a face presented by the user are captured and analyzed. The face presented by the user can be the user's actual face, or could be a picture of a face of the user that is presented by an imposter. An attempt is made to determine whether the images include a live face (e.g., the captured images are of a live human being) or a picture of a face. If it is determined that the images include a live face, then it is assumed that the face presented by the user is the face of the actual user that is requesting the particular access, and the user can be authenticated for access. However, if it is determined that the images include a picture, then it is assumed that the face presented by the user is the face of an imposter using a picture, and the user cannot be authenticated for access.

Figure 1:
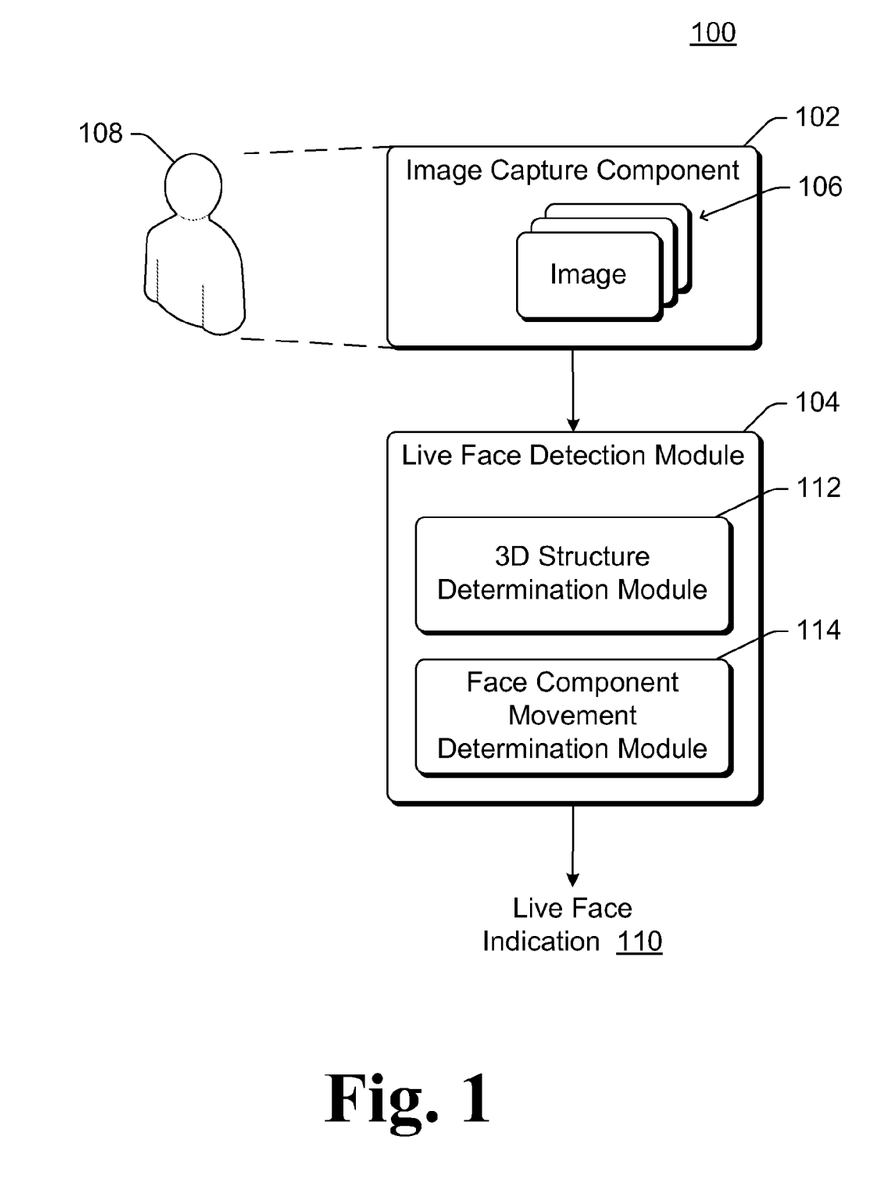
FIG. 1 illustrates an example system implementing the distinguishing live faces from flat surfaces in accordance with one or more embodiments.

FIG. 1 illustrates an example system 100 implementing the distinguishing live faces from flat surfaces in accordance with one or more embodiments. System 100 includes an image capture component 102 and a live face detection module 104. Image capture component 102 and live face detection module 104 can each be implemented by one or more computing devices. A variety of different types of computing devices can be used to implement image capture component 102 and live face detection module 104, such as a desktop computer, a laptop or notebook computer, a notepad computer, a mobile station, an entertainment appliance, a set-top box communicatively coupled to a display device, a television, a cellular or other wireless phone, a digital camera or video camera, a game console, an automotive computer, and so forth.

Image capture component 102 and live face detection module 104 can be implemented as part of the same computing device or alternatively can be implemented as separate devices. When implemented as separate devices, the devices implementing image capture component 102 and live face detection module 104 can communicate with one another via any of a variety of different networks, such as the Internet, a local area network (LAN), a public telephone network, an intranet, other public and/or proprietary networks, combinations thereof, and so forth. Alternatively, when implemented as separate devices, the devices implementing image capture component 102 and live face detection module 104 can communicate with one another via other wired and/or wireless connection mechanisms, such as a universal serial bus (USB), wireless USB, Bluetooth, radio frequency, and so forth.

System 100 is part of, or in communication with, an access control system. Such an access control system can be used to restrict access to a particular system, resource, location, and so forth. For example, system 100 can be used in an access control system that restricts which users can access (e.g., enter) a particular building, which users can access (e.g., log into) a particular computing device, which users can access (e.g., log into) a particular network, and so forth. System 100 facilitates restricting such access by determining whether the images include a live face or a picture of a face, as discussed in more detail below.

Image capture component 102 captures multiple images 106 each including a face presented by a user 108, and makes images 106 available to live face detection module 104. Image capture component 102 can capture images 106 in a variety of different manners, such as using various digital imaging technologies (e.g., charge-coupled devices (CCDs), complementary metal-oxide-semiconductor (CMOS) sensors, and so forth). Typically, user 108 presents himself or herself to image capture component 102, allowing component 102 to capture images 106 of user 108. In such situations, the face presented by user 108 is the face of a live human being, and the face included in images 106 is the face of a live human being. However, an imposter may attempt to fool the access control system by presenting to image capture component 102 a picture of someone else's face. In such situations, the face presented by user 108 is a picture, and the face included in images 106 is a picture of the face.

Live face detection module 104 analyzes images 106 to determine whether images 106 include a live face or a picture of a face, and outputs an indication 110 of whether images 106 include a live face or a picture of a face. Indication 110 can be, for example, a first value to indicate images 106 include a live face (e.g., "live", "yes", "authenticate", etc.) and a second value to indicate images 106 include a picture of a face (e.g., "picture", "no", "do not authenticate", etc.). A live face refers to the face of an actual human being (i.e., image capture component 102 captured images of an actual human being), rather than a picture of the face of a human being. If detection module 104 determines that images 106 include a live face, then live face indication 110 indicates that images 106 include a live face. In such situations, live face indication 110 indicates that user 108 can be authenticated for access (e.g., to whatever system, resource, location, etc. that user 108 is requesting access) because it is assumed that the actual human being that is user 108 is requesting particular access. The authentication of user 108 can be performed by another component or module (not shown) in a variety of different manners, such as by comparing one or more of images 106 to previously captured images of user 108. Alternatively, the authentication can be performed prior to the live face detection performed by module 104, in which case live face indication 110 indicates that any previous authentication of user 108 is valid.

However, if it is determined that images 106 include a face on a flat surface, then it is assumed that user 108 is an imposter using a picture. In such situations, live face indication 110 indicates that user 108 cannot be authenticated for access (e.g., to whatever system, resource, location, etc. that user 108 is requesting access) because it is assumed that user 108 is an imposter requesting particular access. If user 108 was authenticated by another component or module (not shown) prior to the live face detection performed by module 104, then live face indication 110 indicates that any previous authentication of user 108 is invalid.

Live face detection module 104 can determine whether images 106 include a live face or a picture of a face in a variety of different manners. In one or more embodiments, live face detection module 104 includes one or both of a 3-dimensional (3D) structure determination module 112 and a face component movement determination module 114. Generally, 3D structure determination module 112 determines whether images 106 include a face that is a 3D structure (e.g., an actual human being) or a flat surface (e.g., a photograph), and face component movement determination module 114 determines whether motion is present in one or more components of the face in images 106. The manner in which these determinations are made by modules 112 and 114 is discussed in more detail below.

Figure 2:
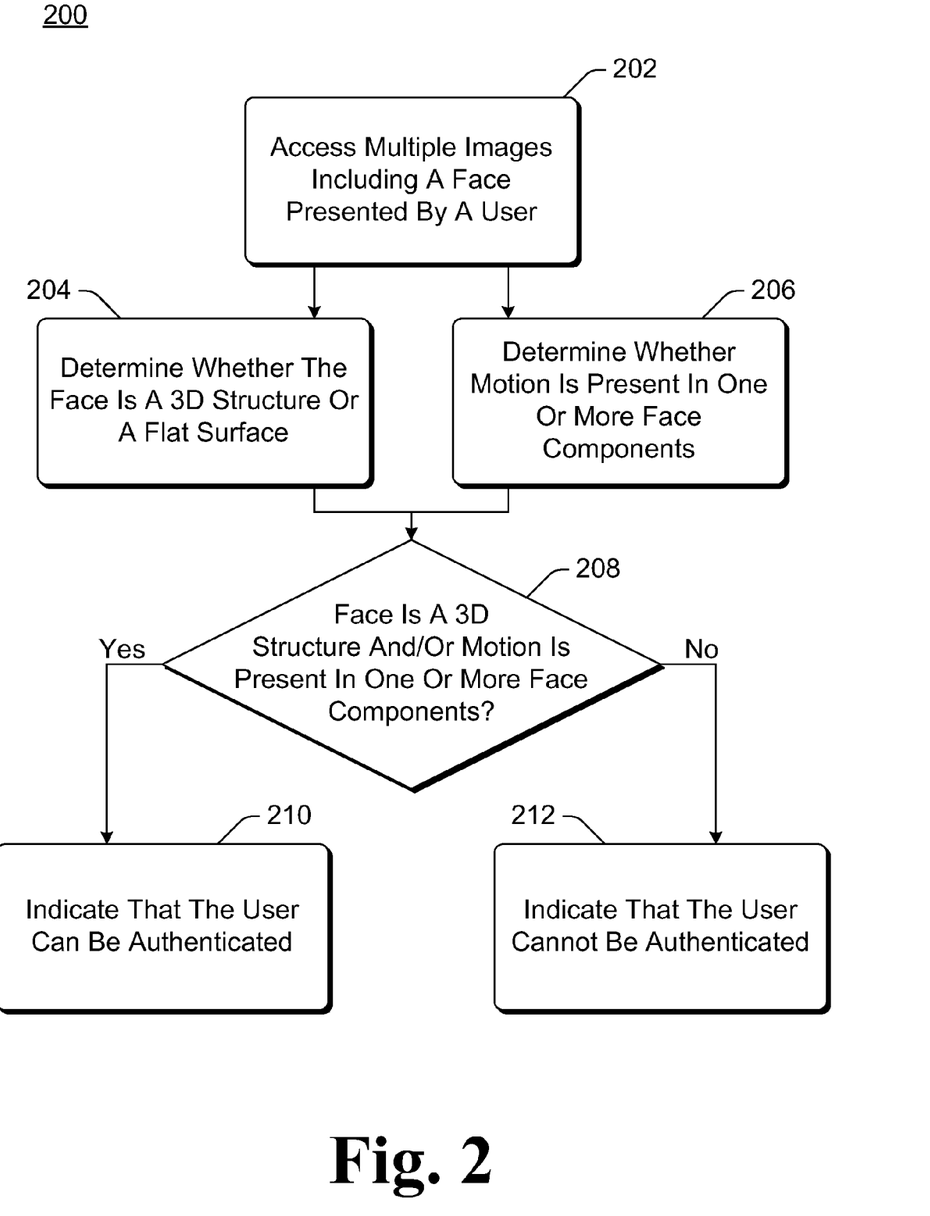
FIG. 2 is a flowchart illustrating an example process for distinguishing live faces from flat surfaces in accordance with one or more embodiments.

FIG. 2 is a flowchart illustrating an example process 200 for distinguishing live faces from flat surfaces in accordance with one or more embodiments. Process 200 is carried out by a live face detection module, such as live face detection module 104 of FIG. 1, and can be implemented in software, firmware, hardware, or combinations thereof. Process 200 is shown as a set of acts and is not limited to the order shown for performing the operations of the various acts. Process 200 is an example process for distinguishing live faces from flat surfaces; additional discussions of distinguishing live faces from flat surfaces are included herein with reference to different figures.

In process 200, multiple images including a face presented by a user are accessed (act 202). These multiple images can be images including a live face or images including a picture of a face. The multiple images are images that have been captured by an image capture component (e.g., image capture component 102 of FIG. 1). These multiple images can be accessed in act 202 in a variety of different manners, such as being received in response to a request sent to the image capture component for the multiple images, being received in response to a request sent to another component or device where the images were stored by the image capture component, images that are streamed or pushed to the live face detection module implementing process 200 (e.g., from the image capture component), and so forth.

Process 200 proceeds to determine whether the face is a 3D structure or a flat surface (act 204) and/or determine whether motion is present in one or more components of the face (act 206). One of acts 204 and 206 can be performed, or alternatively both of acts 204 and 206 can be performed. If both acts 204 and 206 are performed, acts 204 and 206 can be performed concurrently, or alternatively one of acts 204 and 206 can be performed followed by the other of acts 204 and 206 being performed.

Process 200 proceeds based on whether the face is determined to be a 3D structure and/or motion is present in one or more face components (act 208). If the face is determined to be a 3D structure and/or motion is present in one or more face components, then it is determined that images 106 include a live face and an indication that the user can be authenticated is provided (act 210). However, if the face is determined to be a flat surface and/or motion is not present in one or more face components, then it is determined that images 106 do not include a live face and an indication that the user cannot be authenticated is provided (act 212). If acts 204 and 206 are both performed, then it can be determined that images 106 include a live face only if both the face is determined to be a 3D structure in act 204 and motion is determined to be present in one or more face components in act 206. Alternatively, if acts 204 and 206 are both performed, then it can be determined that images 106 include a live face if at least one of the face is determined to be a 3D structure in act 204 and motion is determined to be present in one or more face components in act 206.

Returning to FIG. 1, in one or more embodiments 3D structure determination module 112 uses a homography based technique for determining whether a face included in images 106 is a 3D structure or a flat surface. Alternatively, other techniques can be used, such as a structure from motion estimation technique.

The homography based technique uses a 3×3 homography matrix, also referred to herein as matrix H. The homography based technique leverages the fact that two views of a flat (planar) surface are related based on a homography matrix H. Accordingly, in analyzing a first image and a second image, the first image can be warped or transformed using the homography matrix H to generate a warped image. The warped image is then compared to the second image. If the first and second images are views of a flat surface (e.g., a picture of a face), then the warped image will be similar to the second image. Thus, if the difference between the second image and the warped image is small (e.g., below a threshold value), then the first and second images include a face that is a flat surface rather than a live face. However, if the difference between the second image and the warped image is larger (e.g., at least a threshold value), then the first and second images include a facet that is a live face rather than a flat surface.

Figure 3:
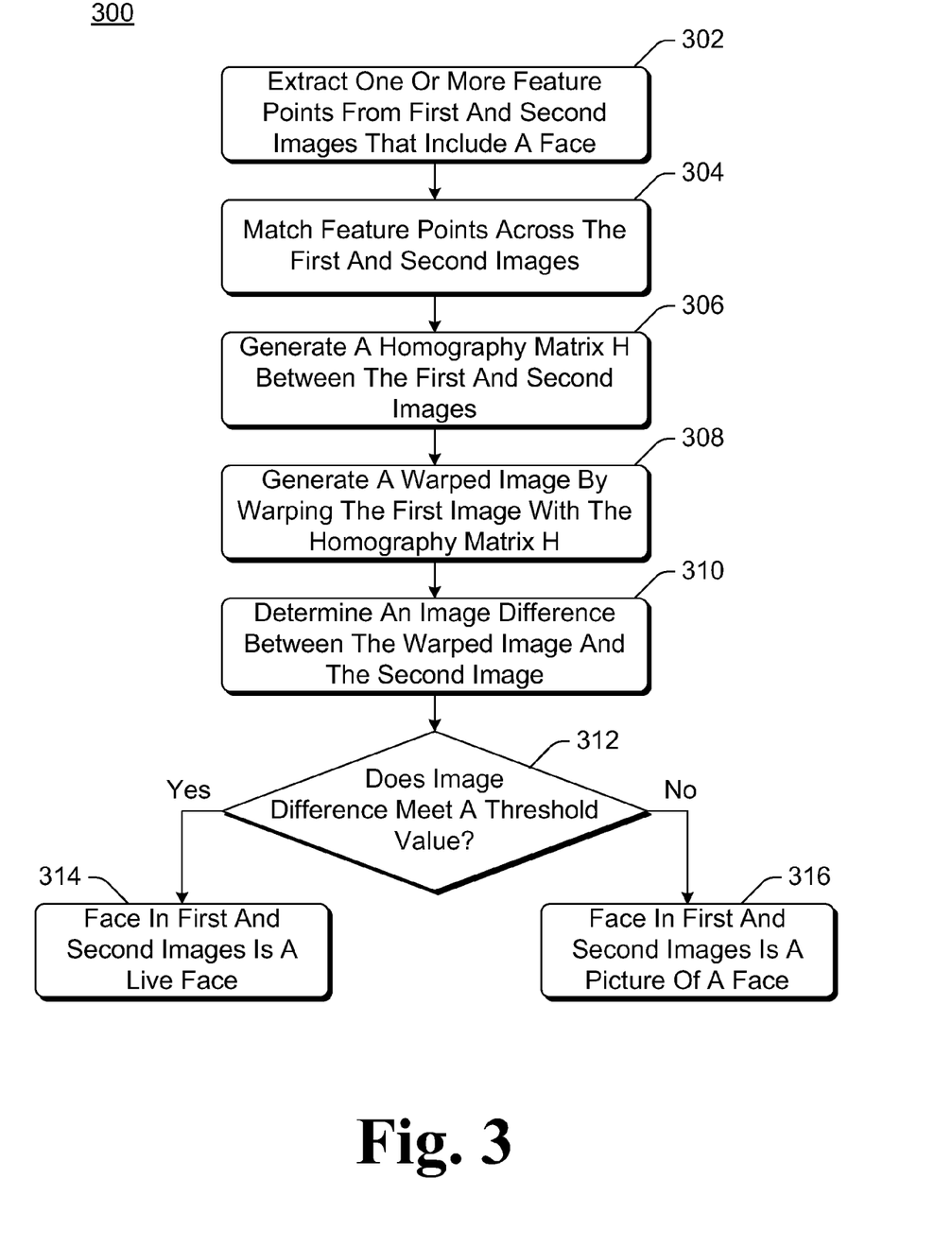
FIG. 3 is a flowchart illustrating an example process for using a homography based technique to determine whether a face in multiple images is a 3D structure or a flat surface in accordance with one or more embodiments.

FIG. 3 is a flowchart illustrating an example process 300 for using a homography based technique to determine whether a face in multiple images is a 3D structure or a flat surface in accordance with one or more embodiments. Process 300 is carried out by a 3D structure determination module, such as 3D structure determination module 112 of FIG. 1, and can be implemented in software, firmware, hardware, or combinations thereof. Process 300 can implement, for example, act 204 of FIG. 2. Process 300 is shown as a set of acts and is not limited to the order shown for performing the operations of the various acts.

In process 300, one or more feature points are extracted from two images, referred to in process 300 as the first and second images (act 302). These first and second images each include a face of the same person, and can be, for example, images 106 of FIG. 1. The one or more feature points are feature points of the face in the first and second images. A variety of different feature points can be extracted, such as a corner of an eye, a corner of a mouth, a tip of a nose, and so forth. Each feature point is a single pixel or a region of multiple pixels. These feature points can be extracted in a variety of different conventional manners, such as using template matching algorithms, feature matching algorithms, and so forth. In one or more embodiments, techniques for extracting feature points are discussed in Zhang et al., "A Robust Technique for Matching Two Uncalibrated Images Through the Recovery of the Unknown Epipolar Geometry", French National Institute for Research in Computer Science and Control (1994).

The feature points extracted in act 302 are matched across the first and second images (act 304). This matching of the feature points across the first and second images refers to identifying the locations of the same feature points in each of the two images. For example, the locations of the same corner of the same eye in the face in the first and second images are identified. The matching of feature points across the first and second images can be performed in a variety of different conventional manners, such as using template matching algorithms, feature matching algorithms, and so forth. After matching, matching feature points across the two images, and the corresponding pixels in the two images within those feature matching feature points, are known.

A homography matrix H between the first and second images is generated (act 306). The first and second images are related by the homography matrix H as follows:

$$\tilde{x}'=\lambda H \tilde{x}$$

where $\tilde{x}$ refers to a location in the first image, $\tilde{x}'$ refers to a location in the second image, H refers to a homography matrix, and $\lambda$ refers to a non-zero scalar value. A location in the first image is represented as $[u,v]^T$, where u and v are the coordinates of the location in the first image. A location in the second image is represented as $[u',v']^T$, where u' and v' are the coordinates of the location in the second image. When calculating the homography matrix H, $\tilde{x}=[u,v,1]^T$ and $\tilde{x}'=[u',v',1]^T$. Given two locations in the two images and with z being the location in the first of the two images, a homography matrix H is calculated by determining a homography matrix H for which the difference between $\tilde{x}'$ as calculated by $\tilde{x}'=\lambda H\tilde{x}$ and the actual location in the second image is small. This homography matrix can be determined in different manners, such as using any of a variety of conventional algorithms to determine that the difference between $\tilde{x}'$ as calculated by $\tilde{x}'=\lambda H\tilde{x}$ and the actual location in the second image is minimized, is below a threshold value, and so forth. In one or more embodiments, the homography matrix can be determined from 4 or more pairs of corresponding locations in the two images, as described below. Let $\{(x_i,x_i')|i=1,\ldots N\}$ be the N pairs (N≥4). Each pair gives an equation $\tilde{x}_i'=\lambda_i H\tilde{x}_i$. Eliminating the unknown scalar factor $\lambda_i$ yields two scalar equations:

$$\tilde{x}_i^T h_1 - u_i'\tilde{x}_i^T h_3 = 0$$

$$\tilde{x}_i^T h_2 - v_i'\tilde{x}_i^T h_3 = 0$$

where $h_j=[H_{j1},H_{j2},H_{j3}]^T$ is the j-th row vector of the homography matrix H. In matrix form: $B_i h=0$, where $h=[H_{11}, H_{12}, H_{13}, \ldots, H_{33}]^T$ is a 9-D vector consisting of the unknown homography elements, and $$B_i = \begin{bmatrix} \tilde{x}_i^T & 0 & -u_i'\tilde{x}_i^T \\ 0 & \tilde{x}_i^T & -v_i'\tilde{x}_i^T \end{bmatrix}$$

is a 2×9 matrix. With N pairs, a 2N×9 matrix B is formed by stacking all $B_i$'s, and an equation Bh=0 is obtained. As h is defined up to a scale factor, the solution is well known to be the eigenvector of the 9×9 matrix $B^TB$ associated with the smallest eigenvalue. This solution includes the elements of homography matrix H (the eigenvector of the solution) to be used in warping the first image as discussed below.

A warped image is then generated by warping the first image with the homography matrix H (act 308). This homography matrix H is the homography matrix H generated in act 306. The first image is warped based on the calculation $y=\lambda H\tilde{x}$ (which is the same as $\tilde{x}'=\lambda H\tilde{x}$, except that y refers to the warped image so y is being used instead of $\tilde{x}'$). Each pixel in the first image has a value $\tilde{x}$ that is used to calculate a value y using $y=H\tilde{x}$. The value y is a vector, and the first and second elements of y are each divided by the third element of y to obtain a location of a pixel in the warped image. In other words, for a value $y=[y_1, y_2, y_3]$, the location of the pixel in the warped image is $$\left[\frac{y_1}{y_3}, \frac{y_2}{y_3}\right].$$

The intensity or color of the pixel in the first image (having the value $\tilde{x}$) is then applied to the pixel at the location $$\left[\frac{y_1}{y_3}, \frac{y_2}{y_3}\right]$$

in the warped image. These intensities or colors of pixels can be represented in a variety of different manners, such as using conventional RGB values, conventional CMYK values, and so forth.

An image difference between the warped image (generated in act 308) and the second image is determined (act 310). The image difference can be computed in different manners. In one or more embodiments, the warped image and the second image are superimposed and the difference in color or intensity values at the same pixels (locations) in the two images is determined. In other words, for each location [u,v] in the warped image, the difference between the color or intensity value at the location [u,v] in the warped image and the location [u,v] in the second image is determined. The differences determined for these different locations are then combined to generate the image difference. The differences can be combined in different manners, such as being averaged together, being added together, and so forth.

In one or more embodiments, the image difference in act 310 is determined by obtaining the difference in color or intensity values between the warped and second images for each location in the warped and second images. In other embodiments, the image difference in act 310 is determined by obtaining the difference in color or intensity values between the warped and second images for selected locations in the warped and second images. The selected locations can be identified or selected in different manners. For example, any of a variety of conventional face detection algorithms or face recognition algorithms can be used to detect the face within each image, and the selected locations are the locations that are part of a face within at least one of the warped and second images. By way of another example, a conventional face detection algorithm can be used to detect various sets of sub-regions within a face (such as eyes, mouth, nose, and so forth), and the selected locations are the locations that are part of a sub-region in at least one of the warped and second images.

A determination is then made as to whether the image difference determined in act 310 meets a threshold value (act 312). The image difference can meet the threshold value by, for example, being greater than the threshold value, being greater than or equal to the threshold value, and so forth. This threshold value can be, for example 10 in situations where the color values can be one of 256 gray levels. This threshold value can be a fixed value (e.g., 10 gray levels) or can be a relative value (e.g., 5% of the number of possible color or intensity values).

If the image difference meets the threshold value, then the face in the first and second images is determined to be a live face (act 314). However, if the image difference does not meet the threshold value, then the face in the first and second images is determined to be a flat surface and thus a picture of a face (act 316).

In one or more embodiments, the first and second images in process 300 are adjacent images in a sequence of three or more images. For example, multiple images (such as 30 or 60 images) can be accessed by the 3D structure determination module implementing process 300. Assume the multiple images are, in their order of capture, image 1, image 2, image 3, image 4, . . . image z. The first and second images in process 300 can be adjacent or sequential images in the sequence of multiple images, such as image 1 and image 2, image 4 and image 5, and so forth. Alternatively, the first and second images in process 300 can be non-adjacent images, having one or more intervening images between them in the sequence of images. For example, the first and second images in process 300 can be image 1 and image 10, image 12 and image 37, and so forth.

Additionally, even if the first and second images in process 300 are not adjacent or sequential images in the sequence, at least part of process 300 can be performed for each adjacent pair of images in the sequence. For example, the feature point extraction and feature point matching in acts 302 and 304 can be generated for each adjacent pair of images in the sequence, which can facilitate the feature matching process when matching features across two images with one or more intervening images.

Furthermore, process 300 can be repeated for multiple pairs of images. Each time process 300 is performed, a determination is made as to whether the face in the pair of images is a live face or a picture of a face. These different determinations can be combined in different manners and a resultant indication of whether the face in multiple images is a live face or a picture of a face can thus be generated. For example, if the determination is made that the face in at least one pair of images is a picture of a face, then the resultant indication of the 3D structure determination module implementing process 300 can be that the multiple images include a picture of a face. By way of another example, if the determination is made that the face in at least a threshold number of pairs of images is a live face, then the resultant indication of the 3D structure determination module implementing process 300 can be that the multiple images include a live face. This threshold number can be a fixed number (e.g., at least 10 pairs of images) or can be a relative number (e.g., at least 90% of the pairs of images for which process 300 was performed).

In one or more embodiments, process 300 also determines whether the first and second images include the same face. This determination can be performed in a variety of different manners. For example, during the matching of feature points in act 304, if all (or at least a threshold number) of the feature points cannot be matched then it is determined that the first and second images are of different faces. By way of another example, a variety of different conventional face recognition techniques can be used to recognize whether the faces in the first and second images are the same person. If it is determined that the first and second images do not include the same face, then various remedial measures can be taken, such as stopping process 300 for the first and second images (but optionally repeating process 300 for other images), indicating that the face in the first and second images is a picture of a face in act 316, and so forth.

Returning to FIG. 1, in other embodiments 3D structure determination module 112 uses a structure from motion estimation technique for determining whether a face included in images 106 is a 3D structure or a flat surface. The structure from motion estimation technique leverages the fact that motion estimation can be used to relate two views of a flat (planar) surface. Accordingly, in analyzing a first image and a second image, an estimated 3D description of the scene can be generated using structure from motion estimation. A plane can then be fitted to the estimated 3D scene. If the fitting error is small (e.g., below a threshold value), then the first and second images are of a flat surface and not a live face. However, if the fitting error is larger (e.g., at least a threshold value), then the first and second images are not of a planar surface and are a live face.

Figure 4:
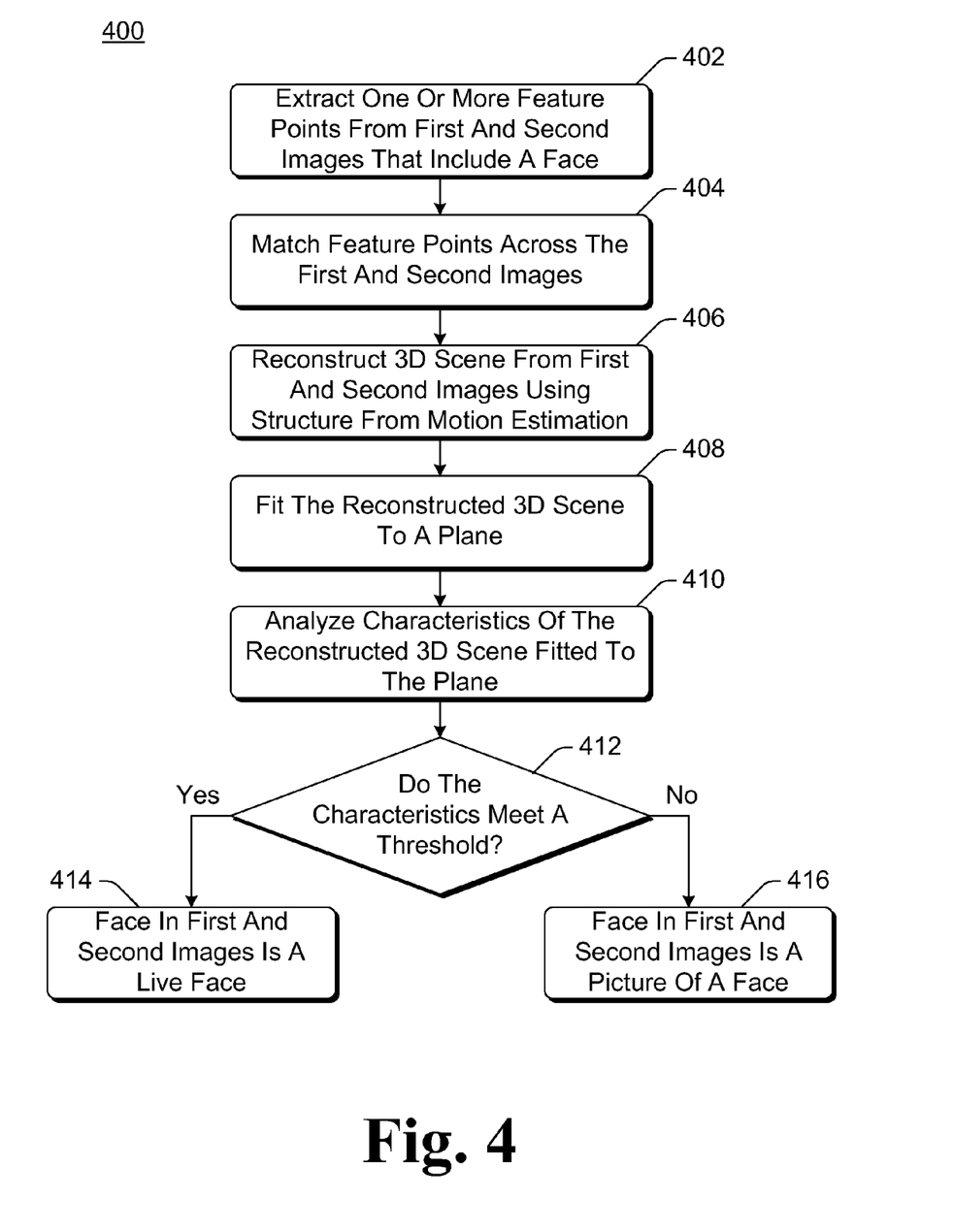
FIG. 4 is a flowchart illustrating an example process for using a structure from motion estimation technique to determine whether a face in multiple images is a 3D structure or a flat surface in accordance with one or more embodiments.

FIG. 4 is a flowchart illustrating an example process 400 for using a structure from motion estimation technique to determine whether a face in multiple images is a 3D structure or a flat surface in accordance with one or more embodiments. Process 400 is carried out by a 3D structure from determination module, such as 3D structure determination module 112 of FIG. 1, and can be implemented in software, firmware, hardware, or combinations thereof. Process 400 can implement, for example, act 204 of FIG. 2. Process 400 is shown as a set of acts and is not limited to the order shown for performing the operations of the various acts.

In process 400, one or more feature points are extracted from two images, referred to in process 400 as the first and second images (act 402). These first and second images each include a face of the same person, and can be, for example, images 106 of FIG. 1. The one or more feature points are feature points of the face in the first and second images. A variety of different feature points can be extracted, such as a corner of an eye, a corner of a mouth, a tip of a nose, and so forth. Each feature point is a single pixel or a region of multiple pixels. Analogous to the discussion above regarding act 302 of FIG. 3, these feature points can be extracted in a variety of different conventional manners.

The feature points extracted in act 402 are matched across the first and second images (act 404). This matching of the feature points across the first and second images refers to identifying the locations of the same feature points in each of the two images. For example, the locations of the same corner of the same eye in the face in the first and second images are identified. Analogous to the discussion above regarding act 304 of FIG. 3, the matching of feature points across the first and second images can be performed in a variety of different conventional manners. After matching, matching feature points across the two images, and the corresponding pixels in the two images within those feature matching feature points, are known.

A 3D scene is reconstructed from the first and second images using structure from motion estimation (act 406). This reconstructed 3D scene is a 3-dimensional description of the scene represented by the first and second images based on estimated motion between the first and second images. The reconstructed 3D scene can be generated in a variety of different conventional manners using well-known structure from motion estimation and stereoscopic vision technology techniques. Such structure from motion estimation and stereoscopic vision technology techniques are based on the matching feature points in act 404.

The reconstructed 3D scene is also fitted to a plane (act 408). This fitting can be performed in a variety of different conventional manners, such as by using various well-known techniques to project the reconstructed 3D scene to a plane.

Characteristics of the reconstructed 3D scene fitted to the plane (generated in act 408) are analyzed (act 410). The characteristics can be analyzed in different manners, such as by comparing ratios of various facial components or feature points to one another. These various facial components or feature points can be, for example, eyes, corners of eyes, corners of mouths, noses, tips of noses, and so forth. For example, the characteristics can be analyzed by obtaining a first value that is a maximum distance from a particular feature (e.g., tip of a nose) in the reconstructed 3D scene to the plane, a second value that is the distance between two facial components on the plane (e.g., the distance between the eyes or between the corners of the eyes), and calculating a ratio of the first value to a second value. Additional sets of values can optionally be obtained, and the results of (e.g., the ratios generated from) those additional sets of values can be combined together (e.g., the calculated ratios can be averaged together).

A determination is then made as to whether the analyzed characteristics in act 410 meet a threshold (act 412). The characteristics can meet the threshold by, for example, being greater than a threshold value, being greater than or equal to a threshold value, and so forth. This threshold can be a fixed value (e.g., the ratio of the first value to the second value from act 410 is greater than 10%) or a relative value (e.g., the ratio of the first value to the second value from act 410 is greater than 5% of the second value).

If the analyzed characteristics meet the threshold value, then the face in the first and second images is determined to be a live face (act 414). However, if the analyzed characteristics do not meet the threshold value, then the face in the first and second images is determined to be a flat surface and thus a picture of a face (act 416).

The first and second images in process 400 can be adjacent images in a sequence of three or more images, or can be further from one another in the sequence of images analogous to the discussion above regarding process 300 of FIG. 3. Additionally, analogous to the discussion above regarding process 300 of FIG. 3, at least part of process 400 (e.g., acts 402 and 404) can be performed for each adjacent pair of images in the sequence of images even if the first and second images in process 400 are not adjacent or sequential images in the sequence.

Furthermore, process 400 can be repeated for multiple pairs of images. Each time process 400 is performed, a determination is made as to whether the face in the pair of images is a live face or a picture of a face. These different determinations can be combined in different manners and a resultant indication of whether the face in multiple images is a live face or a picture of a face can thus be generated. For example, if the determination is made that the face in at least one pair of images is a picture of a face, then the resultant indication of the 3D structure determination module implementing process 400 can be that the multiple images include a picture of a face. By way of another example, if the determination is made that the face in at least a threshold number of pairs of images is a live face, then the resultant indication of the 3D structure determination module implementing process 400 can be that the multiple images include a live face. This threshold number can be a fixed number (e.g., at least 10 pairs of images) or can be a relative number (e.g., at least 90% of the pairs of images for which process 400 was performed).

Additionally, both process 300 of FIG. 3 and process 400 of FIG. 4 can be performed to determine whether the face in the multiple images is a live face or a picture of a face. The determinations made by process 300 and process 400 can be combined in different manners to generate a resultant indication of whether the face in the multiple images is a live face or a picture of a face. For example, if the determination is made that the face in at least one of process 300 and process 400 is a live face, then the resultant indication of the 3D structure determination module implementing processes 300 and 400 can be that the multiple images include a live face. By way of another example, the 3D structure determination module implementing processes 300 and 400 may indicate that the multiple images include a live face only if both process 300 and process 400 determine that the face in the multiple images is a live face.

Returning to FIG. 1, in one or more embodiments face component movement determination module 114 determines whether motion is present in one or more components of the face in images 106. This determination can be in place of, or in addition to, 3D structure determination module 112 determining whether a face included in images 106 is a 3D structure or a flat surface as discussed above. In one or more embodiments, live face detection module 104 determines that images 106 include a live face only if both 3D structure determination module 112 determines that a face included in images 106 is a 3D structure and face component movement determination module 114 determines that motion is present in one or more components of the face in images 106. In other embodiments, live face detection module 104 determines that images 106 include a live face if at least one of 3D structure determination module 112 determines that a face included in images 106 is a 3D structure and face component movement determination module 114 determines that motion is present in one or more components of the face in images 106.

Figure 5:
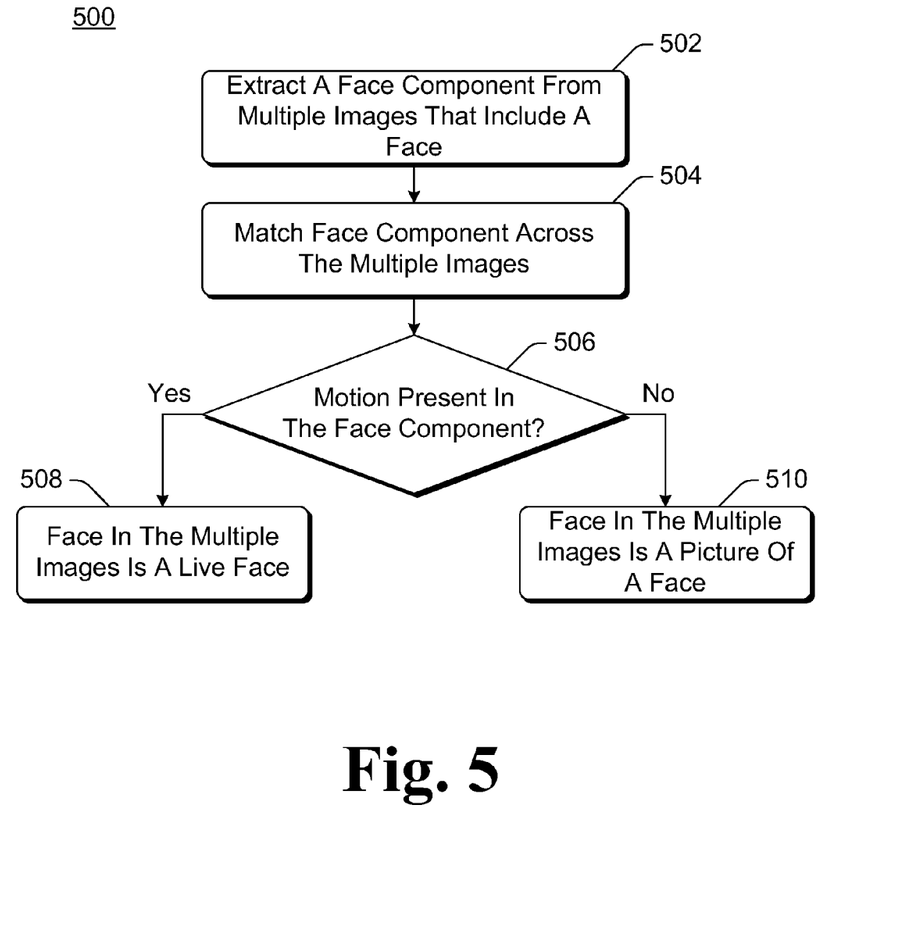
FIG. 5 is a flowchart illustrating an example process for determining whether motion is present in one or more components of a face in accordance with one or more embodiments.

FIG. 5 is a flowchart illustrating an example process 500 for determining whether motion is present in one or more components of a face in accordance with one or more embodiments. Process 500 is carried out by a face component movement determination module, such as face component movement determination module 114 of FIG. 1, and can be implemented in software, firmware, hardware, or combinations thereof. Process 500 can implement, for example, act 206 of FIG. 2. Process 500 is shown as a set of acts and is not limited to the order shown for performing the operations of the various acts.

In process 500, a face component is extracted from multiple images that include a face (act 502). These first and second images include a face, and can be, for example, images 106 of FIG. 1. A face component can be a variety of different parts of a face, and typically is a part of a face that is expected to change over short durations of time. In one or more embodiments a face component is one or both eyes, which are typically expected to change over short durations of time, for example as the person blinks or looks at different objects. In other embodiments, a face component is a mouth, which is typically expected to change over short durations of time, for example as the person talks. Alternatively, other face components can be extracted in act 502. These face components can be extracted in a variety of different conventional manners, and in one or more embodiments are extracted using the same or similar techniques as are used to extract feature points discussed above with respect to act 302 of FIG. 3.

The face component extracted in act 502 is matched across the multiple images (act 504). This matching of the face component across the multiple images refers to identifying the locations of the same face component in each of the multiple images. For example, the locations of the same eye in the face in the multiple images are identified. The matching of a face component across the multiple images can be performed in a variety of different conventional manners, and in one or more embodiments is performed using the same or similar techniques as are used to match feature points across images discussed above with respect to act 304 of FIG. 3.

A check is then made as to whether motion is present in the face component (act 506). Whether motion is present in the face component can be determined in a variety of different manners.

In one or more embodiments, a face component difference between the face components in two images is generated. The difference between the face components in two images can be determined by, for example, superimposing the face components of the two images and determining the difference in color or intensity values at the same pixels (locations) of the face components, analogous to the determination of the image difference discussed above with reference to act 310 in FIG. 3. The differences in color or intensity values for the various pixels of the face components can be combined in different manners (e.g., averaged together or added together) to generate a face component difference, analogous to the discussion above regarding determination of the image difference of act 310 in FIG. 3. Motion is determined as being present in the face component if the face component difference between two images meets a threshold value. The face component difference between the two images can meet the threshold value by, for example, being greater than the threshold value, being greater than or equal to the threshold value, and so forth.

Alternatively, whether motion is present in the face component can be determined in other manners. For example, a neural net, decision tree, or other learning machine can be trained to determine whether eyes in a face are open or closed. Motion can be determined as begin present in the face component if the neural net, decision tree, or other learning machine determines that the face component goes from eyes open to eyes closed (or vice versa) in the multiple images.

If motion is determined as being present in the face component, then the face in the multiple images is determined to be a live face (act 508). However, if motion is not determined as being present in the face component, then the face in the multiple images is determined to be a flat surface and thus a picture of a face (act 510).

Process 500 is discussed with reference to a face component. It should be noted that process 500 can be performed for multiple different face components concurrently, and/or can be repeated for additional face components.

In one or more embodiments, the determination of whether motion is present in the face component in act 506 is made by analyzing (e.g., and determining a face component difference between face components of) two adjacent images in a sequence of three or more images. For example, multiple images (such as 30 or 60 images) can be accessed by the face component movement determination module implementing process 500. Assume the multiple images are, in their order of capture, image 1, image 2, image 3, image 4, . . . image z. The two images that are analyzed (e.g., and for which the face component difference is determined) in act 506 can be adjacent or sequential images in the sequence of multiple images, such as image 1 and image 2, image 4 and image 5, and so forth. Alternatively, the two images that are analyzed (e.g., and for which the face component difference is determined in act 506) can be non-adjacent images, having one or more intervening images between them in the sequence of images. For example, the two images that are analyzed in act 506 can be image 1 and image 9, image 18 and image 39, and so forth.

Additionally, even if the two images that are analyzed in act 506 are not adjacent or sequential images in the sequence, at least part of process 500 can be performed for each adjacent pair of images in the sequence. For example, the face component extraction and face component matching in acts 502 and 504 can be generated for each adjacent pair of images in the sequence, which can facilitate the face component matching process when matching face components across two images with one or more intervening images.

Furthermore, process 500 can be repeated for multiple pairs of images. Each time process 500 is performed, a determination is made as to whether the face in the pair of images is a live face or a picture of a face. These different determinations can be combined in different manners and a resultant indication of whether the face in multiple images is a live face or a picture of a face. For example, if the determination is made that the face in at least one pair of images is a live face, then the resultant indication of the face component movement determination module implementing process 500 can be that the face in the multiple images is a live face. By way of another example, if the determination is made that the face in at least a threshold amount of pairs of images is a live face, then the resultant indication of the face component movement determination module implementing process 500 can be that the face in the multiple images is a live face. This threshold amount can be a fixed amount (e.g., at least 4 pairs of images) or can be a relative amount (e.g., at least 30% of the pairs of images for which process 500 was performed).

Figure 6:
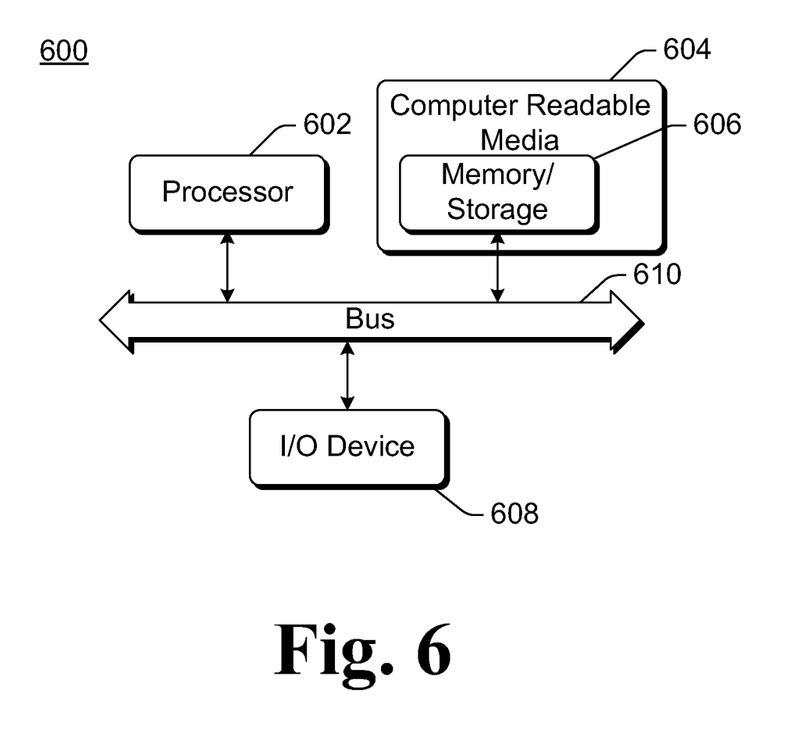
FIG. 6 illustrates an example computing device that can be configured to implement the distinguishing live faces from flat surfaces in accordance with one or more embodiments.

FIG. 6 illustrates an example computing device 600 that can be configured to implement the distinguishing live faces from flat surfaces in accordance with one or more embodiments. Computing device 600 can implement, for example, image capture component 102 of FIG. 1 and/or live face detection module 104 of FIG. 1.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the distinguishing live faces from flat surfaces techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
accessing multiple images including a face presented by a user;
determining, based on the multiple images, whether the face included in the multiple images is a 3-dimensional structure or a flat surface by:
  accessing a first image and a second image of the multiple images;
  generating a warped image by warping the first image using a homography matrix;
  determining an image difference between the warped image and the second image; and
  determining that the face included in the multiple images is a 3-dimensional structure if the difference between the warped image and the second image meets a threshold value, and otherwise determining that the face included in the multiple images is a flat surface;
indicating that the user can be authenticated if the face included in the multiple images is a 3-dimensional structure; and
indicating that the user cannot be authenticated if the face included in the multiple images is a flat surface.

2. A method as recited in claim 1, further comprising:
extracting one or more feature points from the first image and one or more feature points from the second image;
matching feature points across the first image and the second image; and
using feature points matched across the first image and the second image to generate the homography matrix.

3. A method as recited in claim 1, the determining the image difference comprising identifying a first set of sub-regions in the first image, a second set of sub-regions in the second image, and determining a difference between color values of pixels in the first set of sub-regions and the second set of sub-regions.

4. A method as recited in claim 1, further comprising:
repeating the accessing a first image and a second image, generating a warped image, and determining an image difference for multiple pairs of images of the multiple images; and
using the image differences determined for the multiple pairs of images in determining whether the face included in the multiple images is a 3-dimensional structure or a flat surface.

5. A method as recited in claim 1, the multiple images comprising a sequence of three or more images, and one or more intervening images in the sequence of three or more images being between the first image and the second image in the sequence of three or more images.

6. A method as recited in claim 1, further comprising:
determining, based on the multiple images, whether motion is present in one or more components of the face; and
the indicating that the user can be authenticated comprising indicating that the user can be authenticated only if both the face included in the multiple images is a 3-dimensional structure and if motion is present in the one or more components of the face.

7. A method as recited in claim 6, the one or more components including an eye of the face.

8. A method comprising:
accessing multiple images including a face presented by a user;
determining, based on the multiple images, whether the face included in the multiple images is a 3-dimensional structure or a flat surface by:
 accessing a first image and a second image of the multiple images;
 reconstructing a 3-dimensional scene based on the first image and the second image using structure from motion estimation;
 fitting the 3-dimensional scene to a plane;
 analyzing characteristics of the 3-dimensional scene fitted to the plane; and
 determining that the face included in the multiple images is a 3-dimensional structure if the characteristics meet a threshold, and otherwise determining that the face included in the multiple images is a flat surface;
indicating that the user can be authenticated if the face included in the multiple images is a 3-dimensional structure; and
indicating that the user cannot be authenticated if the face included in the multiple images is a flat surface.

9. A method as recited in claim 8, further comprising:
extracting one or more feature points from the first image and one or more feature points from the second image;
matching feature points across the first image and the second image; and
using feature points matched across the first image and the second image to reconstruct the 3-dimensional scene.

10. A method as recited in claim 8, the analyzing comprising:
generating a first value that is a distance between a feature in the reconstructed 3D scene and the plane;
generating a second value that is a distance between two facial components on the plane; and
calculating a ratio of the first value to the second value.

11. A method as recited in claim 8, further comprising:
repeating the accessing a first and a second image, reconstructing the 3-dimensional scene, and determining that the face is a 3-dimensional structure or a flat surface for multiple pairs of images of the multiple images; and
using the determinations that the face is a 3-dimensional structure or a flat surface for the multiple pairs of images in determining whether the face included in the multiple images is a 3-dimensional structure or a flat surface.

12. A method as recited in claim 8, further comprising:
determining, based on the multiple images, whether motion is present in one or more components of the face; and
the indicating that the user can be authenticated comprising indicating that the user can be authenticated only if both the face included in the multiple images is a 3-dimensional structure and if motion is present in the one or more components of the face.

13. A method as recited in claim 12, the one or more components including a mouth of the face.

14. A computing device comprising:
an image capture component configured to capture multiple images including a face presented by a user;
a live face detection module, implemented at least in part in hardware, configured to:
 access the multiple images;
 determine, based on the multiple images, whether the face included in the multiple images is a 3-dimensional structure or a flat surface by:
  accessing a first image and a second image of the multiple images;
  generating a warped image by warping the first image using a homography matrix;
  determining an image difference between the warped image and the second image; and
  determining that the face included in the multiple images is a 3-dimensional structure if the difference between the warped image and the second image meets a threshold value, and otherwise determining that the face included in the multiple images is a flat surface;
 indicate that the user can be authenticated if the face included in the multiple images is a 3-dimensional structure; and
 indicate that the user cannot be authenticated if the face included in the multiple images is a flat surface.

15. A computing device as recited in claim 14, the live face detection module being further configured to:
extract one or more feature points from the first image and one or more feature points from the second image;
match feature points across the first image and the second image; and
use feature points matched across the first image and the second image to generate the homography matrix.

16. A computing device as recited in claim 14, the determining the image difference comprising identifying a first set of sub-regions in the first image, a second set of sub-regions in the second image, and determining a difference between color values of pixels in the first set of sub-regions and the second set of sub-regions.

17. A computing device as recited in claim 14, the live face detection module being further configured to:
    repeat the accessing a first image and a second image, generating a warped image, and determining an image difference for multiple pairs of images of the multiple images; and
    use the image differences determined for the multiple pairs of images in determining whether the face included in the multiple images is a 3-dimensional structure or a flat surface.

18. A computing device as recited in claim 14, the multiple images comprising a sequence of three or more images, and one or more intervening images in the sequence of three or more images being between the first image and the second image in the sequence of three or more images.

19. A computing device as recited in claim 14, the live face detection module being further configured to:
    determine, based on the multiple images, whether motion is present in one or more components of the face; and
    indicate that the user can be authenticated only if both the face included in the multiple images is a 3-dimensional structure and if motion is present in the one or more components of the face.

20. A computing device as recited in claim 19, the live face detection module being further configured to determine whether motion is present in one or more components of the face by:
    extracting a face component from each of the multiple images;
    matching face components across the multiple images;
    determining a face component difference between two of the multiple images; and
    determining whether motion is present in the one or more components based at least in part on the face component difference between the two of the multiple images.

* * * * *